(12) United States Patent
Pate et al.

(10) Patent No.: US 6,728,209 B2
(45) Date of Patent: Apr. 27, 2004

(54) MEASUREMENT OF PACKET DELAY VARIATION

(75) Inventors: Prayson Will Pate, Durham, NC (US); Michael Joseph Poupard, Youngsville, NC (US); Robert Leroy Lynch, Raleigh, NC (US)

(73) Assignee: Overture Networks, Inc., Morrisville, NC (US)

( * ) Notice: Subject to any disclaimer, the term of this patent is extended or adjusted under 35 U.S.C. 154(b) by 0 days.

(21) Appl. No.: 10/200,418

(22) Filed: Jul. 22, 2002

(65) Prior Publication Data

US 2003/0091047 A1 May 15, 2003

Related U.S. Application Data

(60) Provisional application No. 60/307,747, filed on Jul. 25, 2001.

(51) Int. Cl.[7] ............................................ H04L 12/28
(52) U.S. Cl. ...................... 370/230.1; 370/232; 370/412
(58) Field of Search ................................ 370/232, 252, 370/253, 412–414, 416, 417, 418, 230.1

(56) References Cited

U.S. PATENT DOCUMENTS

| | | | |
|---|---|---|---|
| 5,151,899 A | | 9/1992 | Thomas et al. |
| 5,383,189 A | | 1/1995 | Matsuyama et al. |
| 5,541,926 A | | 7/1996 | Saito et al. |
| 5,802,310 A | | 9/1998 | Rajaraman |
| 5,926,475 A | | 7/1999 | Saldinger et al. |
| 5,961,640 A | | 10/1999 | Chambers et al. |
| 6,134,246 A | | 10/2000 | Cai et al. |
| 6,169,748 B1 | | 1/2001 | Barbas et al. |
| 6,233,240 B1 | | 5/2001 | Barbas et al. |
| 6,233,251 B1 | | 5/2001 | Kurobe et al. |
| 6,256,315 B1 | | 7/2001 | Barbas et al. |
| 6,259,677 B1 | * | 7/2001 | Jain ........................... 370/252 |
| 6,304,551 B1 | * | 10/2001 | Ramamurthy et al. ...... 370/232 |
| 6,353,874 B1 | | 3/2002 | Morein |
| 6,434,606 B1 | | 8/2002 | Borella et al. |
| 6,442,166 B1 | * | 8/2002 | McDonald et al. .... 370/395.42 |
| 6,452,950 B1 | | 9/2002 | Ohlsson et al. |
| 2002/0031126 A1 | | 3/2002 | Crichton et al. |

OTHER PUBLICATIONS

Web pages from Zarlink Semiconductors, Inc. with press release dated Apr. 23, 2002, entitled *Zarlink Semiconductor Sets New Performance and Quality Benchmarks for IP* (*Internet Protocol*) *Networking* (printed Feb. 17, 2003; http://news.zarlink.com/common/parser./archive/2002/Apr/23/news001.xml (2 pages).

Stallings, William, *High Speed Networks—TCP/IP and ATM Design Principles, Prentice Hall*, (Table of Contents and pp. 343–347), 1998.

(List continued on next page.)

*Primary Examiner*—Hassan Kizou
*Assistant Examiner*—Ahmed Elallam
(74) *Attorney, Agent, or Firm*—Kevin E. Flynn; Daniels Daniels & Verdonik, P.A.

(57) ABSTRACT

Packet communication systems, or networks, are commonly used for the conveyance of information for data applications. The receive rate of incoming packets varies as congestion in the network causes variation in the amount of time for a packet to traverse the network before being placed into the JAB (Jitter Absorption Buffer). The disclosure contains methods for calculating a real time measurement of PDV (Packet Delay Variation). This real time measurement is useful as a metric on the quality of the service provided by the network or as a trigger for dynamic adjustment of the operation of equipment to optimize for current network conditions. More specifically, the disclosure includes a method that uses variations in the buffer depth of the JAB to measure PDV. This abstract is provided as a tool for those searching for patents, and not as a limitation on the scope of the claims.

25 Claims, 9 Drawing Sheets

OTHER PUBLICATIONS

ATM Forum Technical Committee, The, *Traffic Management Specification—Version 4.1 (Af–TM–0121.000)*, pp. i–viii; 1–119, (Mar. 1999).

Kouvelas, Isidor, Thesis entitled *A Combined Network, System and User Based Approach to Improving the Quality of Multicast Audio*, (May 1998) submitted to the *Department of Computer Science at the University College, London* (125 pages).

Liang et al. *Adaptive Playout Scheduling Using Time–Scale Modification in Packet Voice Communications ICASSP 2001*, Salt Lake City, UT (May 2001) *Information Systems Laboratory, Department of Electrical Engineering, Stanford University*, (printed Sep. 25, 2002), as found at http://www–ise.stanford.edu/ yiliang/presentations/index.html (1 page).

Liang et al. Series of Powerpoint pages entitled *Adaptive Playout Scheduling Using Time–Scale Modification* (Mar. 8, 2001), (printed Sep. 25, 2002), (14 pages) as found at http://www–ise.stanford.edu/\yiliang/presentations/index.html as found under heading at *Netergy VoIP Project: A Show–and–Tell*.

Liang, Yi Series of Powerpoint pages entitled *Loss recovery and Adaptive Playout Control for Packet Voice Communications over IP, Department of Electrical Engineering—Stanford University* (Apr. 19, 2000), (printed Sep. 25, 2002), (22 pages) as found at http://www–ise.stanford.edu/\yiliang/presentations/index.html.

\* cited by examiner

MEASUREMENT OF PACKET DELAY VARIATION

This application claims priority from co-pending U.S. Provisional Patent Application No. 60/307,747 filed on Jul. 25, 2001 for Measurement of Packet Delay Variation.

FIELD OF THE INVENTION

This invention relates to communications systems and methods, in particular, to packet communication systems and methods.

REFERENCES

[1] ATM Forum, "Traffic Management Specification Version 4.1", AF-TM-0121.000, March 1999.
[2] Stallings, "High-Speed Networks—TCP/IP and ATM Design Principles", Prentice Hall, ISBN 0-13-525965-7, 1998.

The references are provided here to illustrate the state of the art and specific portions of the references are discussed below. The references do not constitute a portion of the invention disclosed herein.

BACKGROUND OF THE INVENTION

Delay and Delay Variation in Packet Communications Systems

Packet communication systems, or networks, are commonly used for the conveyance of information for data applications. In general, these data applications are insensitive to absolute propagation delay (APD—the time it takes for a packet to propagate through the network) and propagation delay variation (PDV—changes in the APD, also known as jitter or wander).

Packet communications systems can also be used for transport of applications that are sensitive to APD and PDV. Examples include:
  Direct voice applications such as VoIP
  Leased line applications transported via circuit emulation
  Video applications
  Certain data protocols such as SNA FIG. 1A illustrates the general progression from transmit bits 1010 through encapsulation 1014 to transmit packets 1020 through the packet network 1024 to arriving packets 1030 through the JAB 1034 and de-encapsulation 1038 to become a stream of receive bits 1040. Consider a CBR (Constant Bit Rate) application where the bits are created at constant rate R. The rate R remains constant because there are no pauses in the data stream. The application at the receiving end is typically set to receive and process bits at the same rate R. On the path from creation to processing at the receive end the transmit bits 1010 first arrive at a device that encapsulates them into packets and injects the transmit packets 1020 into a packet network 1024 at rate P. Just as the bits arrive from the application at regular intervals (line 1010 of FIG. 1B), the encapsulating device 1014 sends out packets at regular interval (line 1020 of FIG. 1B). However, the intervening packet network is not perfect, so it introduces PDV due to congestion.

In some situations, packets from one set of packets may travel along different routes from point A to point B, increasing PDV. In other cases switches may re-order packets such that packet N, which was sent before packet N+1, arrives after packet N+1 (see for example packets 2 and 3 in line 1030 of FIG. 1B).

Thus, the arriving packets arrive at a rate that over a large period of time averages out to be creation rate P. But from moment to moment, the receive rate varies as congestion in the network causes variation in the amount of time for a packet to traverse the network. The received packets are processed at the receive end and the encapsulated bits are extracted and placed into the JAB.

Definition and Measurement of CTD and CDV

We will base our definitions of APD and PDV on the existing definitions of Cell Transfer Delay (CTD) and Cell Delay Variation (CDV) for Asynchronous Transfer Mode (ATM) devices. Reference [1] defines CTD as the time that it takes for an ATM cell to traverse the network, and CDV as the range between the minimum and maximum values of CTD. The graph depicting a cell transfer delay probability density model shown in FIG. 2 is a reproduction of FIGS. 3–2 from reference [1].

As shown in FIG. 2, there is a fixed delay through the network that gives the lower bound on CTD. There is also a variable component that changes based on network conditions. The variable delay is bounded by a maximum value of CTD, above which cells will be discarded because they are too late to use. The difference between the minimum and maximum values of CTD gives the peak-to-peak value of CDV:

$$CDV_P = \max CTD - \text{Fixed Delay} \quad (1)$$

Since delay and congestion in the network will change over time, a useful measurement of peak-to-peak CDV should be taken over a long period of time. Another way to look at this is in the frequency domain, where we are looking at the low-frequency components of CDV.

Section 3.6.1.2.1 of [1] gives a "one point" means of measuring an estimate of CDV:

The one-point CDV describes the variability in the pattern of cell arrival events observed at a single measurement point with reference to the negotiated peak rate 1/T (as defined in ITU-T Recommendation I.371).

The one-point CDV for cell k ($y_k$) at a measurement point is defined as the difference between the cell's reference arrival time ($c_k$) and actual arrival time ($a_k$) at the measurement point: $y_k = c_k - a_k$. The reference arrival time ($c_k$) is defined as follows:

$$c_0 = a_0$$

$$c_{k+1} = \begin{cases} a_{k+T} & \text{if } c_k \leq a_k \\ c_{k+T} & \text{otherwise} \end{cases}$$

Positive values of the one-point CDV correspond to cell clumping; negative values of the one-point CDV correspond to gaps in the cell stream. The reference arrival time defined above eliminates the effect of gaps and provides a measurement of cell clumping.

Note that the value 1/T mentioned above is the same as the rate Constant Bit Rate R mentioned above in connection with FIG. 1A.

TABLE 1

Example of CDV Calculation

| k | Actual Arrival Time $A_k$ | Reference Arrival Time $C_k$ | One Point CDV $Y_k$ |
|---|---|---|---|
| 0 | 0.00 | 0 | 0 |
| 1 | 2.09 | 2.00 | −0.09 |
| 2 | 3.95 | 4.09 | 0.14 |
| 3 | 6.09 | 6.09 | 0.00 |

TABLE 1-continued

Example of CDV Calculation

| k | Actual Arrival Time $A_k$ | Reference Arrival Time $C_k$ | One Point CDV $Y_k$ |
|---|---|---|---|
| 4 | 7.98 | 8.09 | 0.11 |
| 5 | 10.06 | 10.09 | 0.03 |
| 6 | 11.97 | 12.09 | 0.12 |
| 7 | 13.90 | 14.09 | 0.19 |
| 8 | 16.10 | 16.09 | −0.01 |
| 9 | 17.97 | 18.10 | 0.12 |
| 10 | 20.06 | 20.10 | 0.04 |

Table 1 shows an example of how this method works, where T has a value of 2 and R has a value of 1/T=½. The estimate of CDV is found by taking the maximum of all of the values of $Y_k$, or 0.19 for the values in Table 1.

Note that while this calculation only provides an estimate CDV, it does have the advantage of not requiring an actual measurement of CTD. Its drawback is that it requires a calculation to be made on each packet in order to create an estimate of CDV.

Note on Time Versus Packets Versus Bytes

In different situations it is convenient to discuss the size of the JAB in terms of time, packets or bytes.

Time—Because APD and PDV are normally discussed in units of microseconds (us) or milliseconds (ms), it may useful to discuss the state of the JAB in terms of time.

Packets—It is more convenient to talk about the JAB in terms of packets when considering the current depth or fullness of the JAB.

Bytes—The JAB feeds a circuit interface, so it is drained byte-by-byte. Also a discussion of a physical implementation is also more convenient in terms of bytes.

Here are some useful conversion formulas:

JAB Depth (time)=8*JAB Depth (bytes)/Circuit Bit Rate R (bps)

Packet Period (time)=1/Packet Rate P (pps)

Packet Payload (bytes)=Circuit Bit Rate R (bps)*Packet Period (time)/8

JAB Physical Memory (bytes)=JAB Depth (time)*Circuit Bit Rate R (bps)/8

Examples for common circuits are shown in Table 2 below. The packet periods shown are typical, but they could be higher or lower for a given implementation.

TABLE 2

Comparison of Time, Packets and Bytes for Common Transmission Circuits

| Circuit Type | Circuit Rate (Mbps) | Packet Frame Count | Packet Payload (bytes) | Packet Period (µs) | Packet Rate P (pps) | Physical memory (Kbytes) for a JAB of this depth in ms | | |
|---|---|---|---|---|---|---|---|---|
| | | | | | | 32 | 64 | 128 |
| T1 | 1.544 | 8[1] | 193 | 1000 | 1000 | 6.2 | 12.4 | 24.7 |
| T3 | 44.736 | 1[2] | 699 | 125 | 8000 | 178.9 | 357.9 | 715.8 |
| OC3 | 155.52 | 0.5[3] | 1215 | 62.5 | 16000 | 622.1 | 1244.2 | 2488.3 |

Notes:
[1] 8 frames gives a good balance between efficiency (~75% with 50 bytes overhead) and capture delay (1 ms)
[2] 2 frames would exceed the 1508 byte maximum packet size for Ethernet This real time measurement of PDV is useful when reported to the user of the service as a metric on the quality of the service provided by the network. Current Service Level Agreements ("SLAs") for a packet service will often include a limit on absolute packet delay (not PDV), lost packets and uptime (service availability). These limits could be absolute, but a guarantee of a certain percentage of service within allowable limits is more common. With the introduction of a standardized method for providing a PDV metric, the PDV values can become a negotiated term in the relevant Service Level Agreement between a supplier of network services and a particular user. This is especially useful in systems that do not measure round trip delay.

The network service provider can hold down PDV by avoiding overloading the network with traffic. A second way to provide low PDV to a particular subset of customers is to implement a priority scheme to give priority to packets covered by a premium SLA.

The real time measurement of PDV can also be used as a trigger for dynamic adjustments to the operation of the equipment at either the transmission or the reception ends. For example, U.S. patent application Ser. No. 10,141,592 for Automatic Adjustment of Buffer Depth for the Correction of Packet Delay Variation makes use of a measurement of packet delay variation as measured by the present application for use in a control scheme to optimize the JAB buffer depth for current network conditions. U.S. patent application Ser. No. 10/141,592 is hereby incorporated by reference.

Note that those of ordinary skill in the art can convert the PDV calculation from packets to bytes, or from packets to remaining time before the buffer would be drained at a constant drain rate. These alternate representations of PDV can be used in Service Level Agreements or in control schemes.

It is therefore an object of the present invention to provide an accurate and computationally simple estimate of PDV.

It is a further object of the present invention to provide an estimate of PDV that reflects recent network conditions and thus tracks changes in network characteristics.

These and other advantages of the present invention are apparent from the drawings and the detailed description that follows.

SUMMARY

The present invention is directed to a method of estimating packet delay variation for a packet communication system. Our invention provides an accurate and computationally simple method to estimate PDV. The metric of packet delay variation is useful as a descriptor of the most recent (and presumably current) operating characteristics of the packet communication system. These snapshots describing performance over periods of time can be stored to provide a record, and these individual readings can be combined to form descriptions of the network over longer time ranges. This estimate of PDV can be used to determine if a quality of service for network communications is being delivered. The metric can also be used in control systems to modify the network performance or the performance of the jitter absorption buffer that receives the incoming packets.

Several variations of the method are discussed. In one preferred embodiment, a system that places incoming packets into the JAB is described. An estimate of PDV is made by periodically measuring the range of JAB addresses with stored packets. As described above, the estimate of PDV is proportional to the difference between the largest range of JAB addresses (the "High Water Mark") and the lowest range of JAB addresses (the "Low Water Mark"). In the preferred embodiment the result of HWM−LWM is then divided by the drain rate (or multiplied by the time for a packet to be drained). A triggering event causes the calculation of the PDV estimate and the re-initialization of the parameters HWM and LWM. A typical triggering event can be a timer.

Other variations of the PDV estimate can be calculated including a smoothed value of PDV and a PDV value for a sliding window of time.

DESCRIPTION

Use of a JAB to Measure PDV

Unlike the "one point" method reviewed in a previous section, the present invention uses the JAB itself to measure PDV. A measure of PDV using the JAB gives an accurate and meaningful measure, since the JAB responds to variations in PDV and operates to compensate for variations in PDV. The JAB depth and variations of PDV are also indirectly linked in that excessive PDV translates into overflows or underflows of the JAB.

The JAB operates as a circular queue. The JAB is initialized to be half full. When the network experiences congestion, the JAB will start to empty out, as the steady drain of the JAB exceeds the rate of filling. As congestion is removed, the JAB will start to fill up, as the steady drain of JAB is less than the short-term surge of packets. Since the rate of sending of packets is constant, the surge comes from previously sent but delayed packets arriving along with packets that were not delayed.

Definition of APD and PDV

We will use definitions for APD and PDV that are analogous to the definitions of CTD and CDV. APD is the time it takes for a packet to propagate through the network, and $PDV_P$ is the peak-to-peak range of values for APD. The $i^{th}$ sample of APD is therefore given by:

$$APD_i = R_i - T_i \qquad (2)$$

where $T_i$ is the time that a packet was sent and $R_i$ is the time that a packet was received and written into the JAB. Likewise, the peak-to-peak value of PDV is given by:

$$PDV_P = \max(APD_i) - \min(APD_i) \qquad (3)$$

For a CBR stream, the packets are sent at regular intervals, and must be played out at regular intervals. Each packet must therefore experience the same delay D. A correctional JAB delay $D_i$ must be added to each packet such that:

$$D = APD_i + D_i \qquad (4)$$

and $$APD_i = D - D_i \qquad (5)$$

Figure 1A:
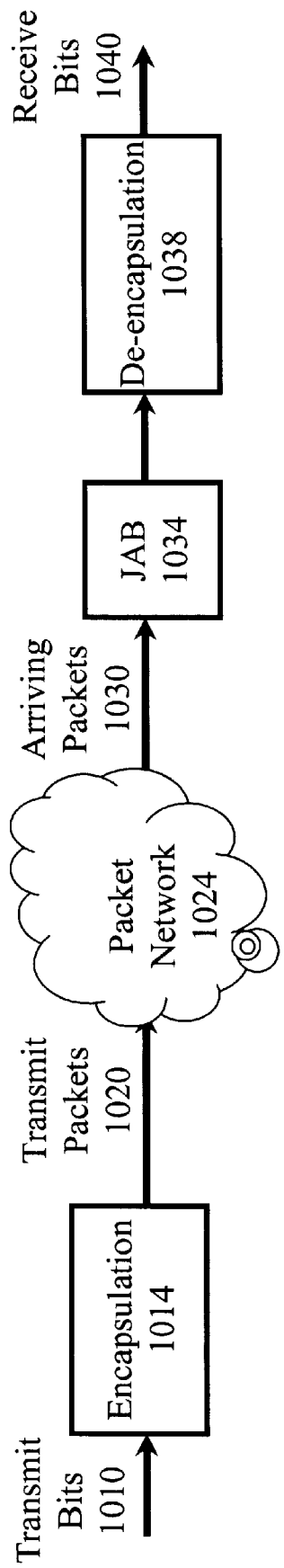
FIG. 1 illustrates the flow path and timing of bits and packets in a network with some variation in PDV.
Figure 1B:
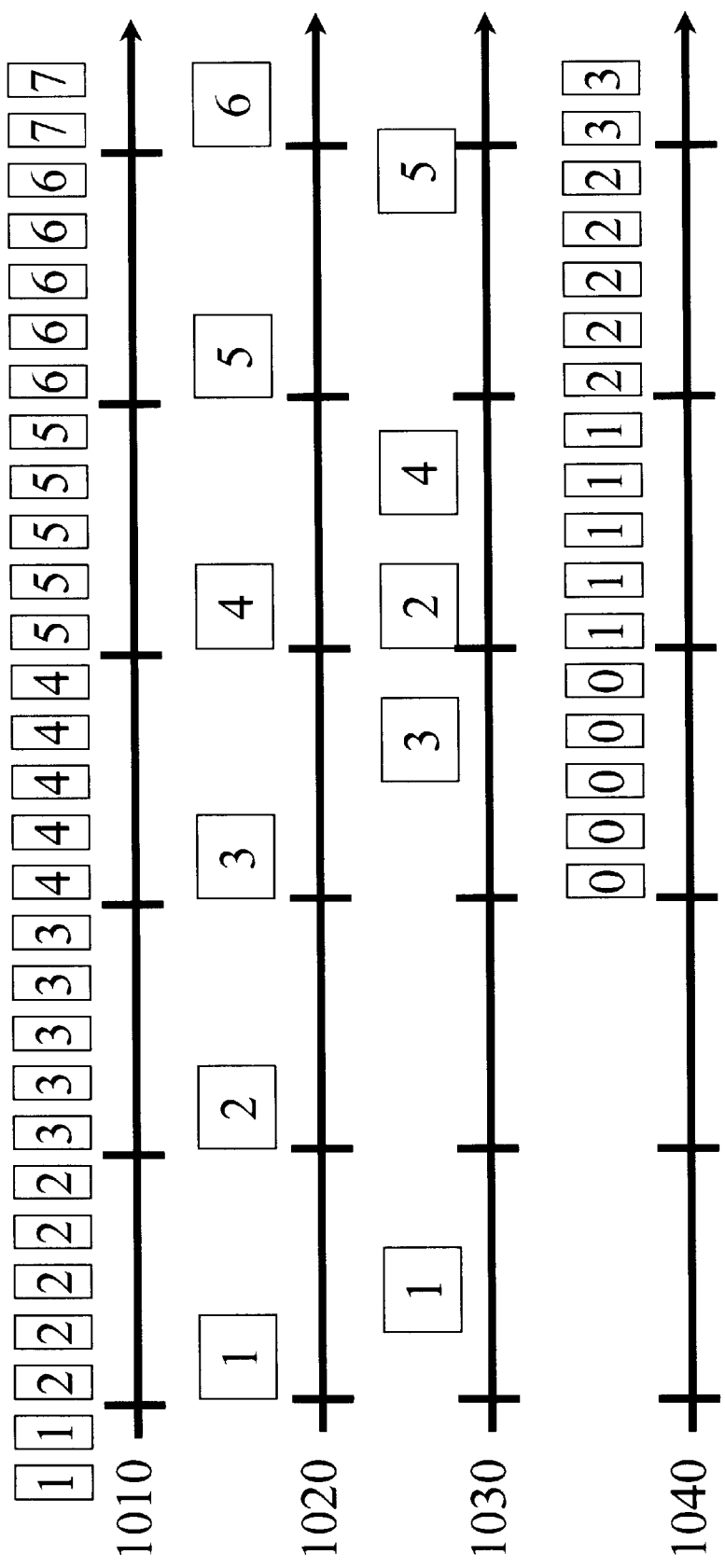
Figure 2:
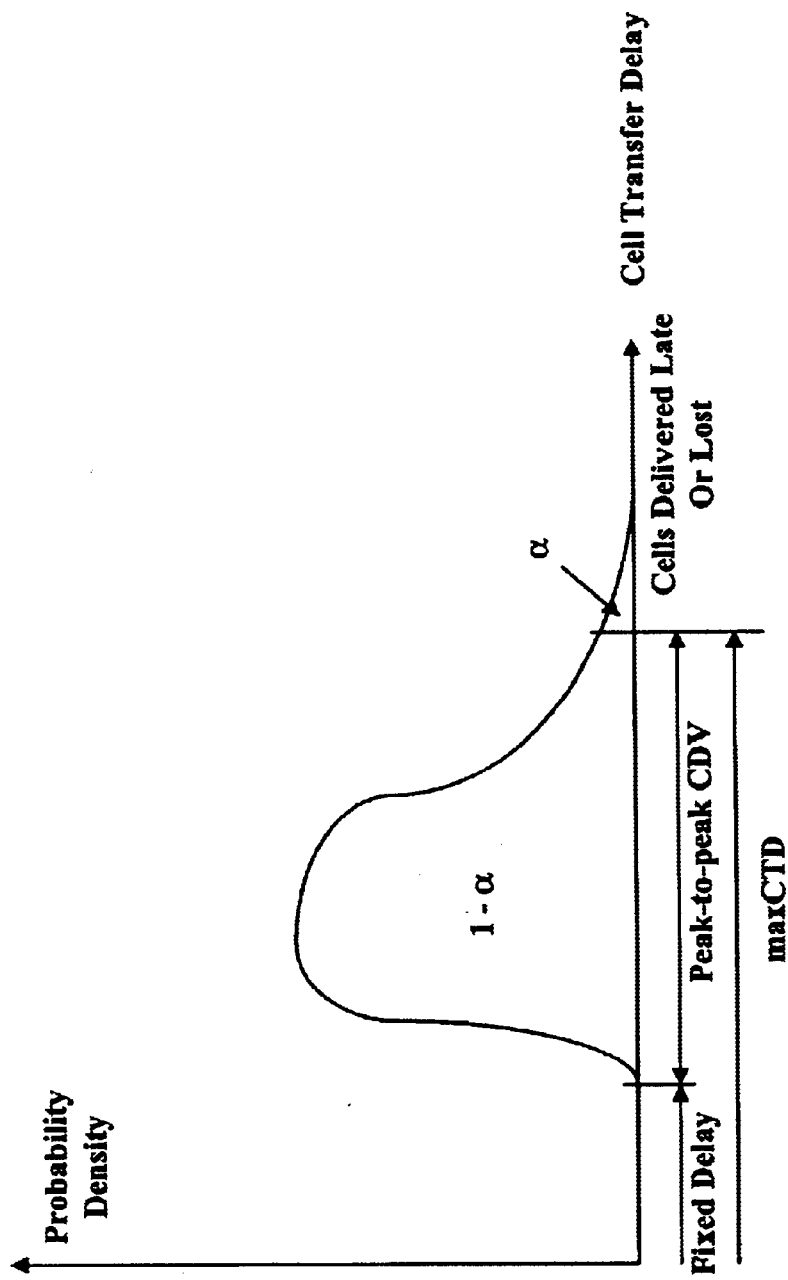
FIG. 2 is a graph depicting a cell transfer delay probability density model used in the prior art to describe Cell Delay Variation for ATM devices.
Figure 3:
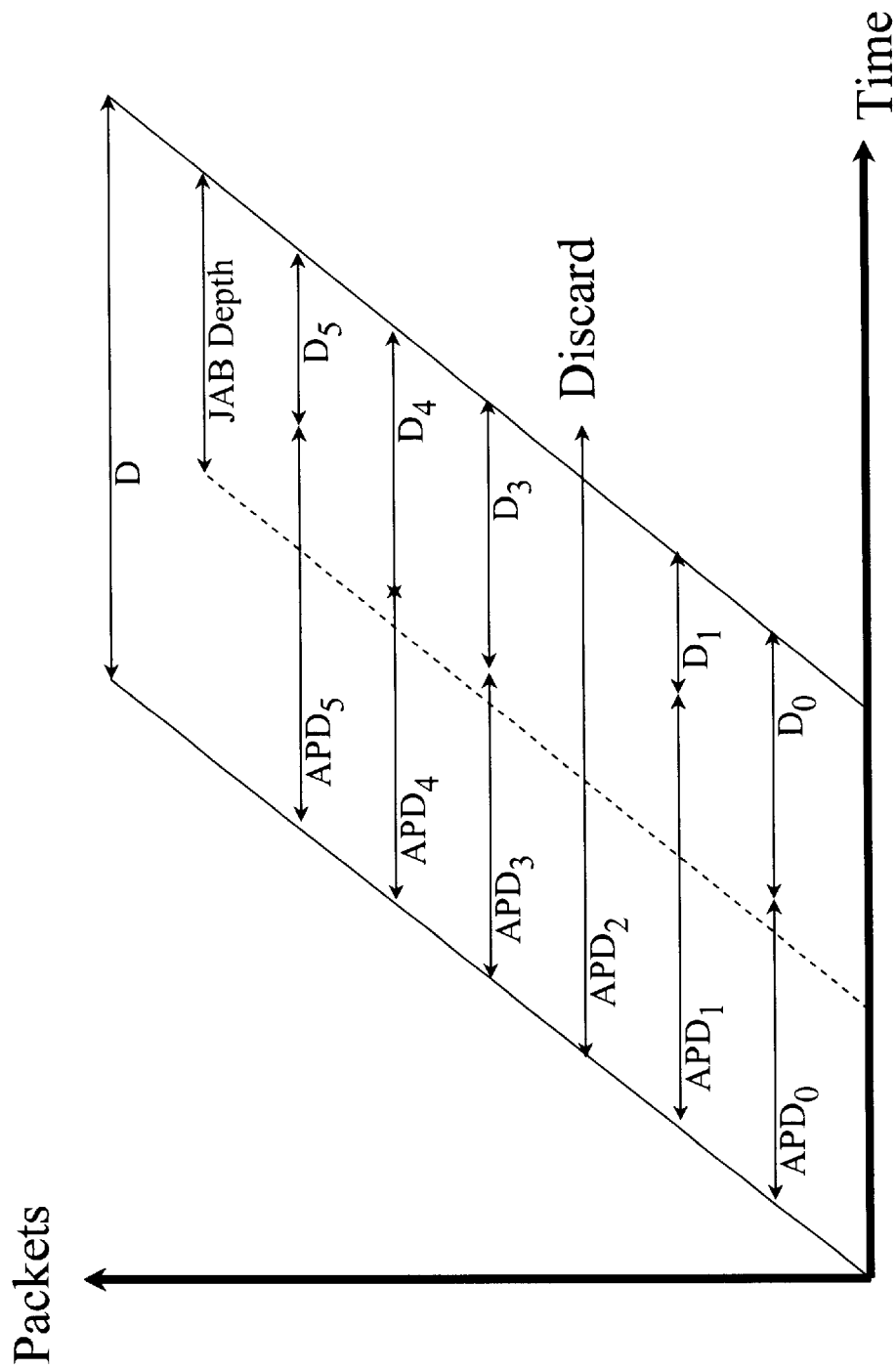
FIG. 3 illustrates the relationship between $APD_i$ and $D_i$ for a system with a constant creation and drain rate of R.

Note that $D_i$ is always positive and it must be less than the depth of the JAB. FIG. 3 (adapted from FIG. 12.1 in [2]) shows an example for $APD_i$ and $D_i$. Note that $APD_2$ was greater than D, so it could not be corrected and was discarded.

Measurement of PDV

For any given packet, $D_i$ is the time that it has to wait while it is in the JAB. Since packets are read out at a constant rate R, $D_i$ is proportional to the number of packets between the given packet and the read pointer, measured at the time that the packet was written into the JAB. The proportionality is given by T=1/R:

$$D_i = (W_i - R_i) * T \qquad (6)$$

where:
- $W_i$ is the location in the JAB where the $i^{th}$ packet was written
- $R_i$ is the location of the read pointer when the $i^{th}$ packet was written
- T is the time it takes to read out a packet (and the time between transmitted packets)

Note that the actual algorithm must take wrapping into account, but this complication is not shown here in order to highlight the concept of the present invention.

Substituting equation 6 into equation 5 yields:

$$APD_i = D - (W_i - R_i) * T \qquad (5)$$

The term $(W_i-R_i)$ is the difference between the location where the $i^{th}$ packet was written in the buffer and where the read pointer was at that time.

Case 1: All Packets Arrive in Order

If all packets that are sent arrive in order, then the current packet being process is always written to the end of the JAB. Note that this section also applies to systems that drop misordered packets when such systems are working with networks that infrequently drop packets. The resulting loss of accuracy in the estimate of PDV is then acceptable.

The waiting time for the current written packet is easily calculated from the depth of the JAB at the time that the packet was written:

$$APD_i = D - (\text{Buffer Spaces Used})*T \quad (7)$$

Note that if the current packet is the packet with the lowest APD, then it must wait the longest time before being sent, and the JAB depth will therefore be at a maximum. The converse is also true, where the packet with the highest APD will correspond to the JAB being at a minimum. The JAB can be constructed such it remembers each maximum as a high water mark (HWM) and each minimum as a low water mark (LWM).

Figure 4:
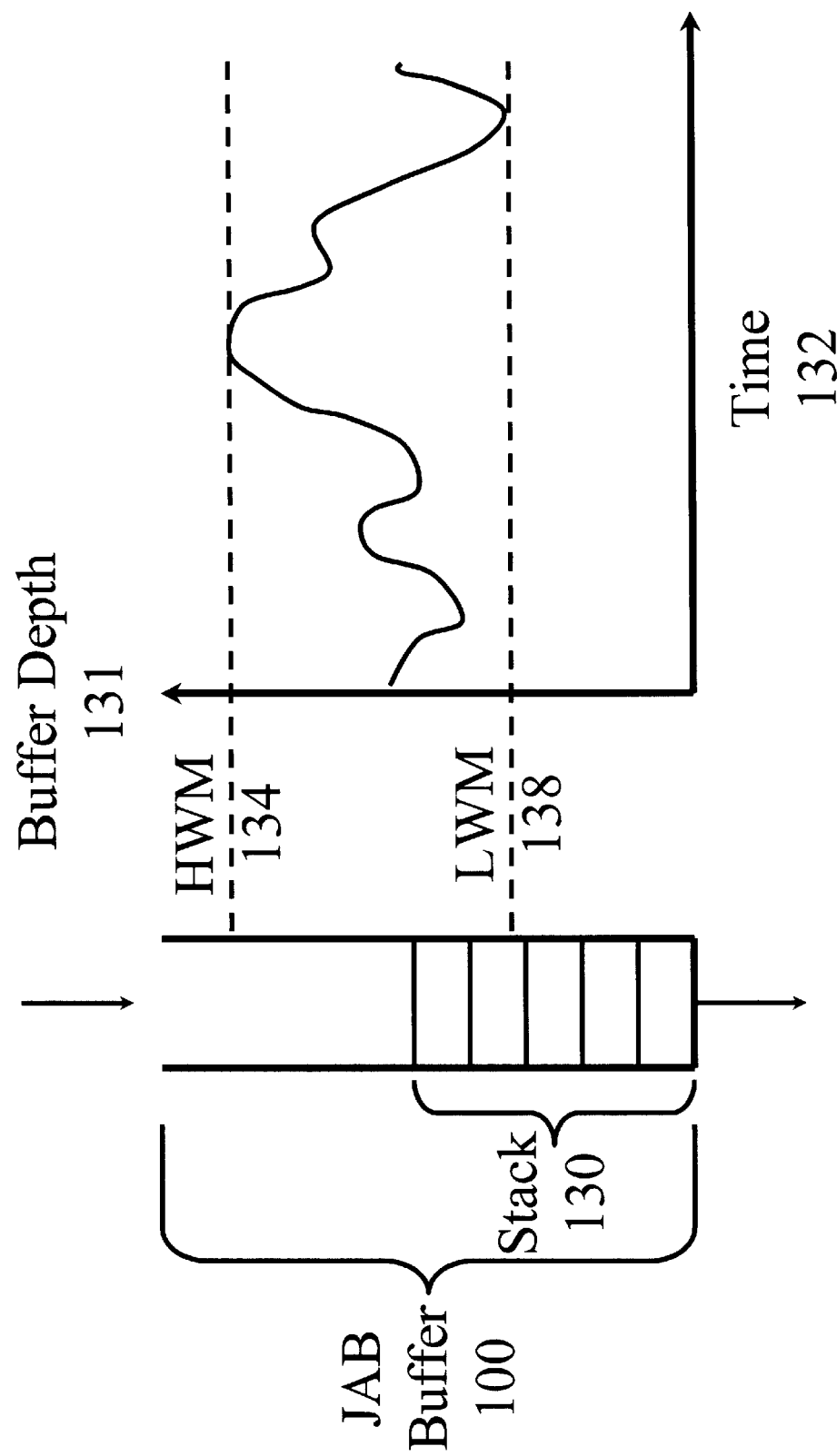
FIG. 4 illustrates a JAB modified to remember each maximum JAB depth experienced within a measurement period as a high water mark (HWM) and each minimum JAB depth experienced within a measurement period as a low water mark (LWM).

FIG. 4 shows an example of HWM and LWM. To the left of FIG. 4 is a representation of a JAB implemented in a buffer 100. Note that the JAB need not be implemented as a circular buffer. In order to convey the concept of water levels, the buffer is shown with a stack of packets 130. Packets arrive at the top and are drained from the bottom. To the right of FIG. 4 is a graph showing the variation of buffer depth 131 over time 132. The highest buffer level over the graphed period is the HWM 134. Conversely the lowest buffer depth over the graphed period of time is the LWM 138.

We can now write equations for the minimum and maximum values of APD:

$$APD_{min} = D - HWM*T \quad (8)$$

$$APD_{max} = D - LWM*T \quad (9)$$

Substituting equations 8 and 9 into equation 3 yields:

$$\begin{aligned} PDV_P &= APD_{max} - APD_{min} \quad (10) \\ &= (D - LWM*T) - (D - HWM*T) \\ &= (HWM - LWM)*T \end{aligned}$$

Rather than calculate PDV for each packet, we can simply calculate $PDV_P$ from the HWM and the LWM. The algorithm below shows how HWM and LWM are tracked.

Initialize variables

HWM=0

LWM=Buffer Size

For each packet:

---

{Write the packet and calculate the JAB depth}
{Check the watermarks}
If (JAB Depth < LWM)
    LWM = JAB Depth
If (JAB Depth > HWM)
    HWM = JAB Depth

---

Case 2: Packets Arrive out of Order and/or some are Missing

If the packets can arrive out of order and/or some are missing, and if the packets are placed at the end of the JAB, then the current depth may not be an accurate reflection of the PDV. For example, a missing packet will cause the depth of the JAB to be less than it would have been if the packet had arrived, and PDV may be underestimated. A correction for these cases must be provided.

Figure 5:
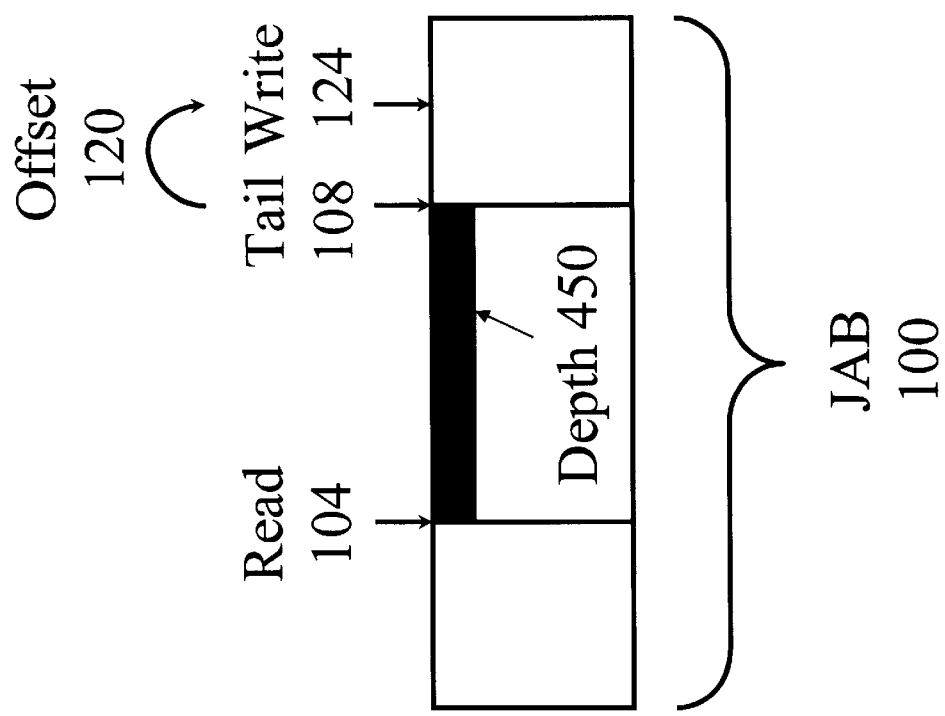
FIG. 5 illustrates the placement of the write pointer relative to the tail pointer without any wrapping.
Figure 6:
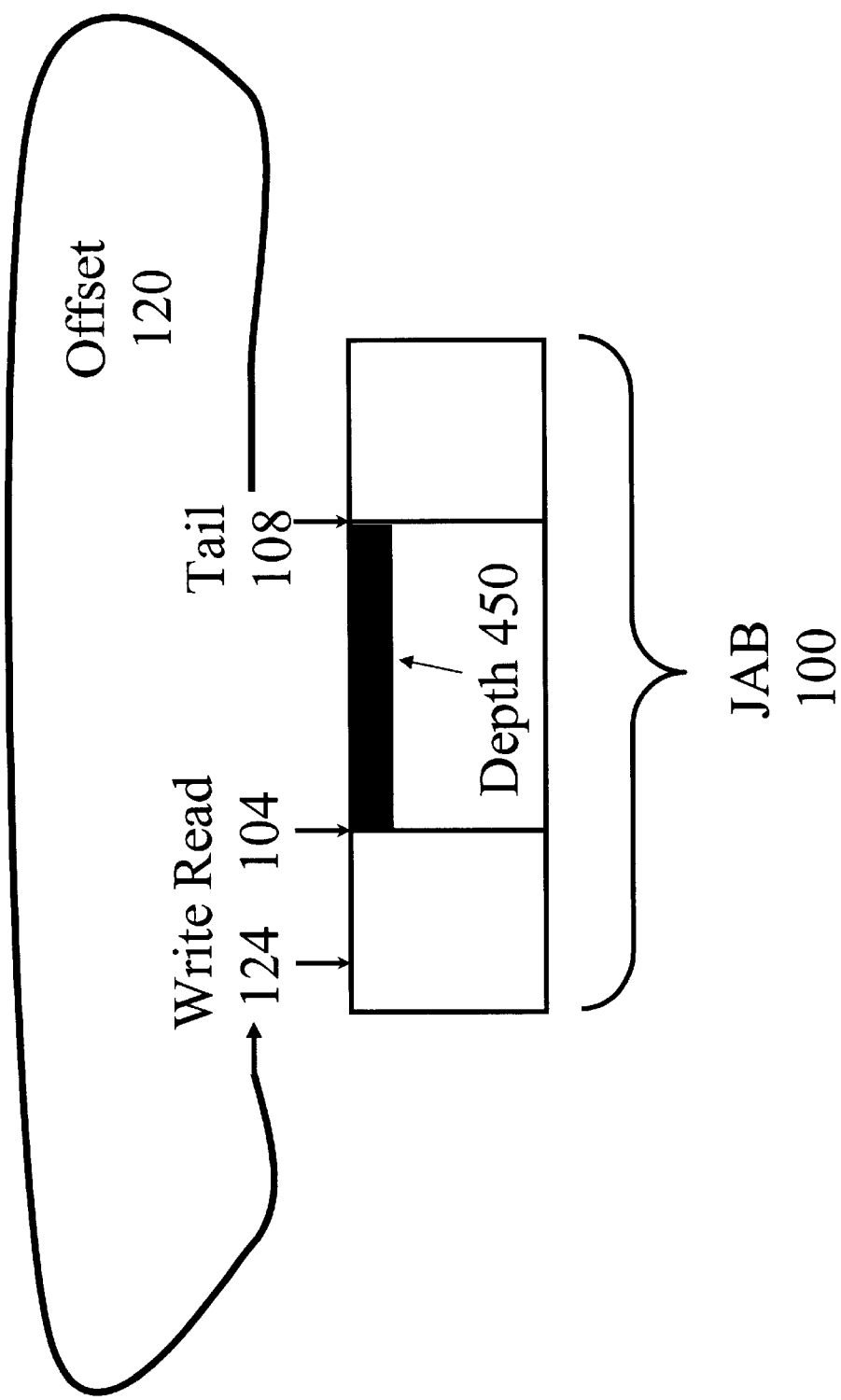
FIG. 6 illustrates the placement of the write pointer sufficiently beyond the tail pointer to wrap past the highest address in the circular buffer.
Figure 7:
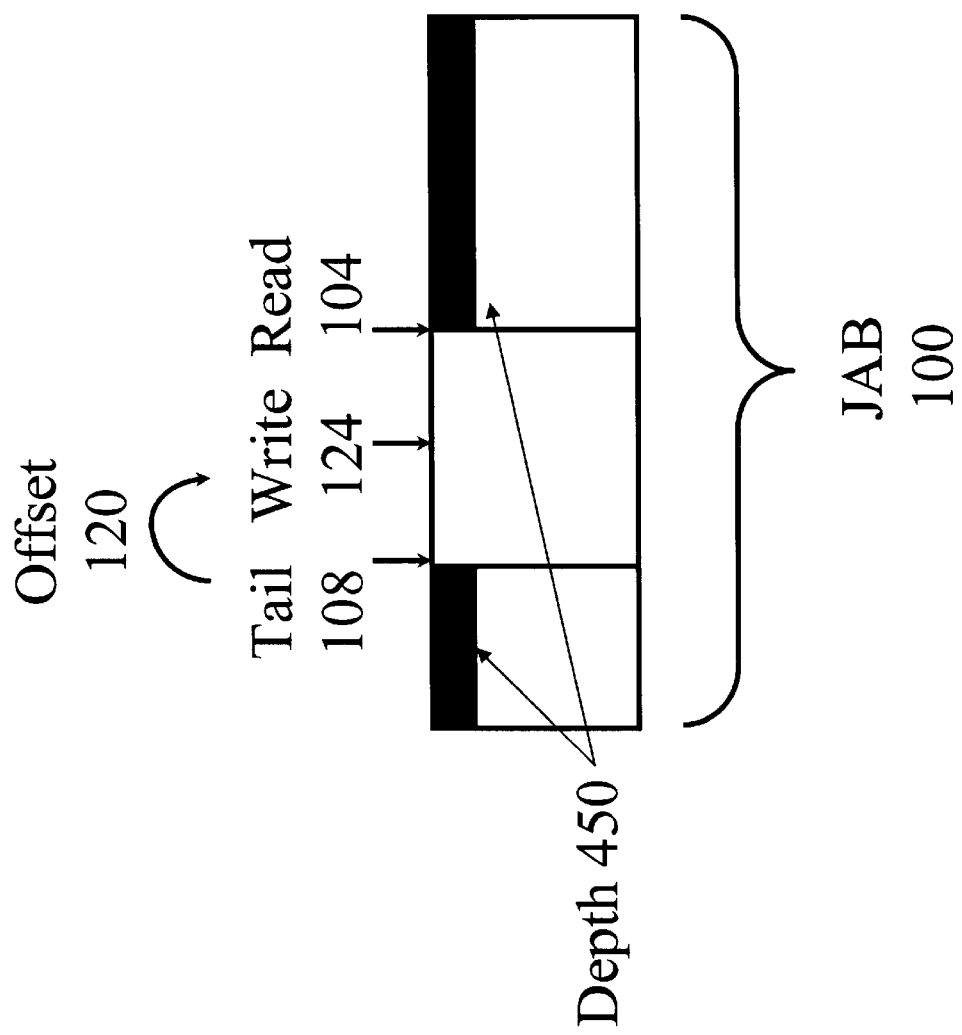
FIG. 7 illustrates the placement of the write pointer in unused buffer space when the circular buffer is wrapped.

For the case of out of order packets, it will be useful to view FIGS. 5–7. In FIG. 5, the circular buffer 100 is shown with a current read pointer 104 and a tail pointer 108. Packets are read from the buffer at the read pointer. It is advantageous to use the sequence number of the incoming packets to place such packets into the circular buffer in such a way that they will be read out in sequence even if the packets arrived mildly out of sequence. This process is described in detail in co-pending application with common assignee for Use of a Circular Buffer to Assure In-Order Delivery of Packets with U.S. patent application Ser. No. 10/190,416. This co-pending application is incorporated by reference.

Arriving packets are written to an address 124 in the circular buffer 100 based on a calculated write pointer offset 120. The range of addresses between the current read pointer and the current tail pointer is the buffer depth 450 and this is marked in FIGS. 5–7 as a dark line at the top of the circular buffer. This dark line does not indicate whether all the address spaces in this range contain valid data as some address spaces may be waiting for packets that are arriving out of sequence. FIG. 5 shows a current buffer usage that does not wrap and a write pointer offset 120 that does not wrap. FIG. 6 shows a current buffer usage that does not wrap but the write pointer offset wraps from a high address at the current tail pointer 108 to a low address 124 for the appropriate address to receive the incoming packet. FIG. 7 shows the case of a current buffer usage that wraps from high addresses to low addresses.

The algorithm for monitoring the depth of the buffer and tracking HWM and LWM is as follows:

---

{Calculate where the packet should be written}
Write Pointer Offset = Current Sequence Number – Tail Sequence Number
{See if the sequence number wrapped going from max back to 0}
If (Write Pointer Offset < 0 – Buffer Size)
    Write Pointer Offset = Write Pointer Offset + Count of Sequence Numbers
{See if we went backwards due an out-of-order delivery}
If (Write Pointer Offset > Buffer Size)
    Write Pointer Offset = Write Pointer Offset – Count of Sequence Numbers
{See how many spaces are used and how many are available}
Buffer Spaces Used = (1 + Tail Pointer – Current Read Pointer) modulus (Buffer Size)
Buffer Spaces Available = Buffer Size – Buffer Spaces Used
{See if the packet is too early or out of range}
Rule 1: If (Write Pointer Offset > Buffer Spaces Available)
    Discard
{See if the packet is too late or out of range}
Rule 2: Else if (Write Pointer Offset < (1 – Buffer Spaces Used))
    Discard
Else {Packet is OK; write it to the JAB}
    New Write Pointer = (Tail Pointer + Write Pointer Offset) modulus (Buffer Size)
    Write the packet to space indicated by the New Write Pointer
    {See if the buffer got deeper, which means that we have a new tail}
    If (Current Read Pointer < Tail Pointer < New Write Pointer)
        {See FIG. 5}
    Or if (New Write Pointer < Current Read Pointer < Tail Pointer)
        {See FIG. 6}
    Or if (Tail Pointer < New Write Pointer < Current Read Pointer)
        {See FIG. 7}
        {Update the tail information}
        Tail Pointer = New Write Pointer -continued

```
Tail Sequence Number = Current Sequence Number
{Check the watermarks}
If (Buffer Spaces Used < LWM)
    LWM = Buffer Spaces Used
If (Buffer Spaces Used > HWM)
    HWM = Buffer Spaces Used
{Calculate the PDV Sample}
PDV_i = (HWM - LWM) * T
```

Where the state variables, which must be remembered between each packet, and are shown in bold above, are:

Tail Sequence Number—This is the sequence number from the packet that was written to the tail.

Count of Sequence Numbers—the total number of sequence numbers. For a range is 0 to 15, the count would be 16.

Tail Pointer—a pointer to the highest location (taking wrapping into account) where a packet has been written. This packet will be read later than any other packet currently in the buffer.

Buffer Size—the total size of the circular buffer in packets.

Current Read Pointer—where the next packet will be read from the buffer.

HWM—The high water mark for the buffer depth.

LWM—The low water mark for the buffer depth.

T—The time it takes to read out a packet. T equals the inverse of the JAB drain rate And where the temporary variables, which are computed anew for each packet, are:

Current Sequence Number—the sequence number read from the current packet

Write Pointer Offset—This is an offset from the Tail Write Pointer to the write location for the current packet. This offset may be positive or negative.

Buffer Spaces Used—this is a calculation of the amount of the circular buffer that is occupied between the head and the tail. (Note that there may be some circular buffer spaces that are left empty awaiting late packets so Buffer Spaces Used may exceed the number of spaces holding packets.)

Buffer Spaces Available—this is a calculation of the amount of the circular buffer that is available for packets. (This calculation excludes the empty buffer spaces in the "Buffer Spaces Used" portion of the circular buffer)

New Write Pointer—this points to the write location for the current packet.

An alternative to calculating PDV after each incoming packet is handled is to check HWM and LWM on set intervals such as periods of time or numbers of packets. This would tend to miss the highest and lowest values of the buffer level and would tend to under report swings in buffer level but could be a viable metric.

Another alternative would be to employ this method in a system that stores the packets external to the JAB but stores control blocks in the JAB memory slots. These control blocks would contain an indication of the location of the corresponding packet so that the packet could be read at the appropriate time. For systems using the sequence number, the sequence number for the packet could be placed in the control block as well. A system using a JAB that stores control blocks rather than packets could be used for any type packet, but is particularly advantageous in systems receiving variable length packets where the variation in packet length is considerable.

Although in an extreme case, the time to read a set of variable length packets might vary somewhat from a fixed drain rate, in general a metric based on HWM-LWM shows the stability or instability of the current network operation.

Reporting PDV

If the measurements for HWM and LWM were not periodically reset these values would continue to grow over time as they recorded the record highs and lows for an extended period of time. Thus PDV measurements based on the difference between HWM and LWM are sensitive to the interval of measuring (and resetting) HWM and LWM. A preferred value for the interval of time between measuring (and resetting) HWM and LWM is 15 minutes, which is a commonly used interval for reporting of network statistics. Other intervals (such as 1 minute, 24 hours, or even a month) may be appropriate in other situations, or if the network was particularly volatile or stable. The calculated value of PDV for each interval is recorded, providing a historical measure of PDV over an extended period.

One of ordinary skill in the art would recognize that a counter of incoming packets could serve as an alternative to measuring time. Thus, HWM and LWM could be reset after the receipt of a fixed number of packets.

In addition to reporting periodic samples of PDV, it is also desirable to smooth the samples to providing a running average. The following method is used, where S is a "smoothing factor" and is preferably a power of 2 (e.g. 16) for ease of computation.

The following algorithm is run periodically (e.g. every 15 minutes):

Sample the current values of HWM and LWM and calculate a new sample of PDV $$PDV_i = (HWM-LWM)*T$$

Reset HWM and LWM $$HWM = LWM = \text{Buffer Spaces Used}$$

Calculate new value of $PDV_P$ $$PDV_P = (S*PDV_P - PDV_P + PDV_i)/S$$

Note that the exponential filter used here is an infinite impulse response (IIR) filter. For an ideal system, the impact of a given sample lasts forever, albeit in an exponentially decreasing fashion. Since the smoothing function started with zero, the initial smoothed values will be artificially influenced towards zero. This is a common issue for smoothing functions and those of skill in the art know to avoid relying on early values of a smoothing function. If response time is important, then PDVp can be initialized to a value that is closer to expected values than zero.

An alternative approach would be to base the measurements on a "sliding window" of measurements of the Buffer Spaces Used, rather than on the HWM and LWM values. The window would store a number of samples (designated W), and each time a new sample is added the oldest sample is overwritten and forgotten. The following algorithm is run periodically (e.g. every 15 minutes):

Advance the window $$j = (j+1) \text{ modulus } (W)$$

Sample the current value of JAB depth $$Depth_j = \text{Buffer Spaces Used}$$

Find the high and low water marks

HWM$_S$=max (all W values of Depth)

LWM$_S$=min (all W values of Depth)

Calculate a new sample of PDV

PDV$_P$=(HWM$_S$-LWM$_S$)*T

Note that an exponentially smoothed average is no longer calculated, as the sliding window will accomplish a similar smoothing effect.

Figure 8:
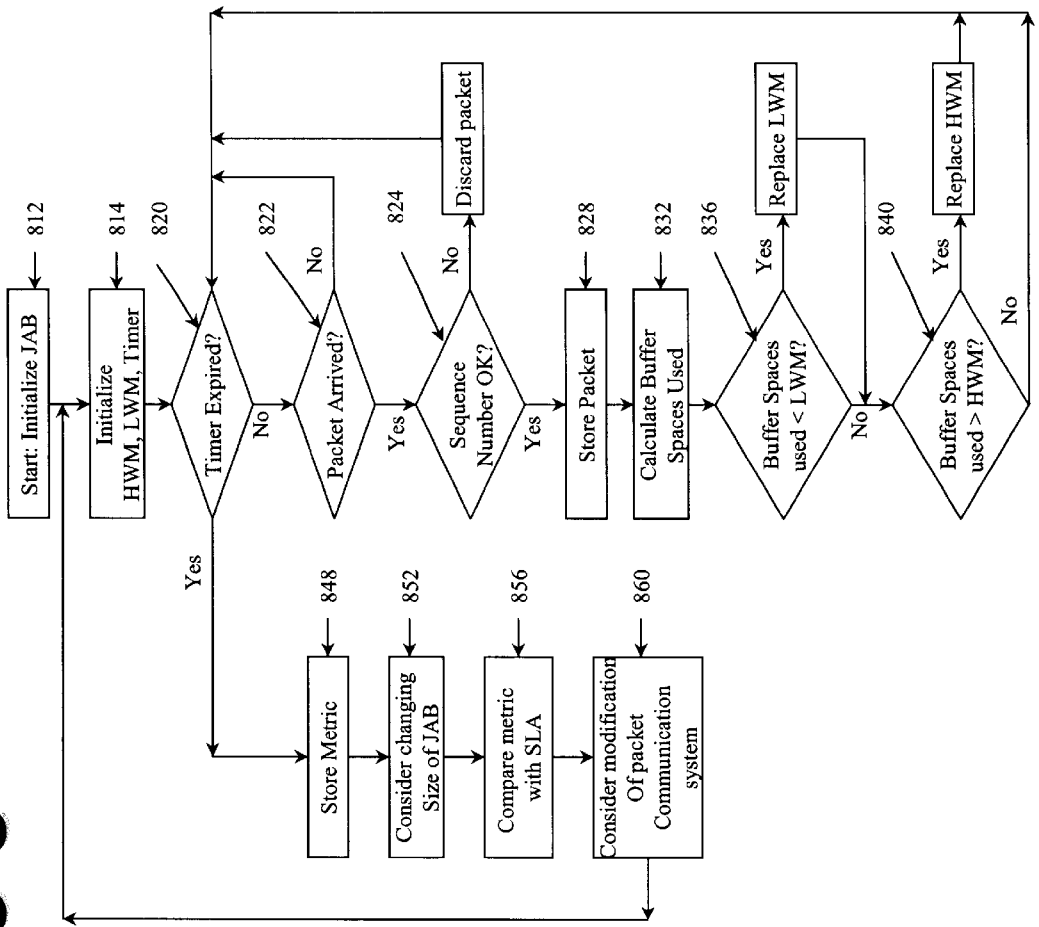
FIG. 8 illustrates some of the variations of the inventive process at a high level of abstraction.

D) Please add text after Page 16 line 15 as follows:

FIG. 8 illustrates some of the possible variations of this process at a high level of abstraction.

Step 812: Initialize number of space in JAB. (This could be memory slots to hold packets or memory slots to hold information indicating where the corresponding packets are stored).

Step 814: Initialize HWM, LWM, and Timer to run for time P. (As discussed, an alternative is to count a set number of packets in lieu of a timer).

Branch 820: Go to 848 if timer has expired. Go to 822 otherwise.

Branch 822: Go to 824 if a packet has arrived. Go to 820 otherwise.

Branch 824: Discard incoming packet with sequence numbers that indicate that the incoming packet cannot be stored in the JAB and read out in sequence, and then go to 820. Go to 828 otherwise.

Step 828: Store the incoming packet in a JAB memory slot that is appropriate for the packet to be read out in sequence.

Step 832: Calculate a Buffer Spaces Used Value (In the preferred embodiment, this is the range of spaces in current use and does not adjust for an unused buffer space within the range of buffer spaces in use).

Branch 836: Replace the Existing LWM value with the current value of Buffer Spaces Used if the current value is less.

Branch 840: Replace the Existing HWM value with the current value of Buffer Spaces Used if the current value is more.

Step 848: Store a metric proportional to HWM−LWM as a snapshot of the recent performance of the packet communication system.

Step 852: Stored metric evaluated by control system to determine if JAB size should be altered.

Step 856: Stored metric compared against Service Level Agreement value.

Step 860: Stored metric evaluated by control system to determine if operation of packet communication system needs to be modified. Go to 814.

In the cases of stored metrics, they may be combined with other metrics in sliding windows or smoothing functions. Steps 852, 856, and 860 are illustrative of various uses of a metric proportional to HWM−LWM. The present invention can be implemented to calculate a metric proportional to HWM−LWM whether or not the metric is used for one, two, or all three of the uses shown in FIG. 8.

| Acronyms and Abbreviations | |
|---|---|
| APD | Absolute Packet Delay |
| ATM | Asynchronous Transfer Mode |

-continued

| Acronyms and Abbreviations | |
|---|---|
| CBR | Constant Bit Rate |
| CDV | CDV is the range between the minimum and maximum values of CTD |
| CTD | CTD is the time that it takes for an ATM cell to traverse the network. |
| bps | bits per second |
| JAB | Jitter Absorption Buffer |
| LWM | Low Water Mark |
| HWM | High Water Mark |
| ms | milliseconds |
| ppm | parts per million |
| pps | packets per second |
| PDV | Packet Delay Variation |
| SLA | Service Level Agreement |
| µs | microseconds |

We claim:

1. A method for use in a packet communication system for calculating a real-time estimate of a quality of service metric for the packet communication system delivering packets to a Jitter Absorption Buffer (JAB), the JAB comprising: a set of storage slots corresponding to a set of memory addresses, a Current Read Pointer, and a Tail Pointer; the JAB having a drain rate of R, the method comprising:

A) initializing:
      A LWM value;
      A HWM value; and
      A Timer running for period P;
   B) Placing an incoming packet into a storage slot in the JAB corresponding to a memory address;
   C) Calculating the number of Buffer Spaces Used;
   D) If Buffer Spaces Used<LWM then LWM=Buffer Spaces Used;
   E) If Buffer Spaces Used>HWM then HWM=Buffer Spaces Used; and
   F) If Timer has reached time P
      THEN
      Store the current value for (HWM−LWM)/R for the current period P; and
      GOTO Step A;
      ELSE
      GOTO Step B.

2. The method of claim 1 further comprising the step of using a set of stored values for (HWM−LWM)/R for a series of time periods P to check whether the stored values exceed a quality of service metric in a Service Level Agreement.

3. The method of claim 1 wherein the step of placing the incoming packet into the storage slot in the JAB corresponding to the memory address includes the calculation of a Write Pointer Offset to select the memory address based on a sequence number for the incoming packet.

4. The method of claim 1 wherein the step of placing the incoming packet into the storage slot in the JAB corresponding to the memory address includes the sub-step of discarding the packet if out-of-sequence, before storing only in-sequence packets into the storage slot in the JAB corresponding to the memory address.

5. The method of claim 1 further comprising use of the recent value for (HWM−LWM)/R for a recent period P in a control system to adjust the operation of the packet communication system to adjust for the recently experienced quality of service.

6. The method of claim 5 wherein the control system adjusts the number of addresses used by the JAB so that the JAB has one number of addresses when the recent calculation of (HWM−LWM)/R is at a first level and the JAB has a second higher number of addresses when the recent calculation of (HWM−LWM)/R is at a second higher level.

7. The method of claim 1 further comprising the calculation of a smoothed sample of (HWM−LWM)/R, the method further comprising:

Setting PDVi=(HWM−LWM)/R after Timer reaches P; and

Calculating PDVp=((S*PDVp)−PDVp+PDVi)/S to provide a smoothed value.

8. A method for use in a packet communication system for calculating a real-time estimate of a quality of service metric for the packet communication system delivering packets to a system with a Jitter Absorption Buffer (JAB), the JAB comprising: a set of storage slots corresponding to a set of memory addresses, a Current Read Pointer, and a Tail Pointer; the JAB having a drain rate of R, the method comprising:

A) initializing:
   A LWM value;
   A HWM value; and
   A Timer running for period P;
B) Placing a control block related to the incoming packet into a storage slot in the JAB corresponding to a memory address; the control block comprising a location indicator for the memory slot outside of the JAB used for the incoming packet;
C) Calculating the number of Buffer Spaces Used;
D) If Buffer Spaces Used<LWM then LWM=Buffer Spaces Used;
E) If Buffer Spaces Used>HWM then HWM=Buffer Spaces Used; and
F) If Timer has reached time P
   THEN
   Store the current value for (HWM−LWM)/R for the current period P; and
   GOTO Step A;
   ELSE
   GOTO Step B.

9. A method for use in calculating an estimate of a Packet Delay Variation (PDV) metric for the recent operating characteristics of a packet communication system delivering incoming packets to a Jitter Absorption Buffer (JAB), the method comprising:

Storing an incoming packet in a JAB memory slot;

Determining a Buffer Spaces Used value that is the number of addresses in a range of memory addresses starting with a next JAB memory address to be read and ending with a memory address containing a packet with the largest sequence number (after adjusting for sequence number wrapping);

Replacing a stored value for the minimum value ("LWM") of Buffer Spaces Used with a new minimum number if the new Buffer Spaces Used value is less than the previously stored LWM;

Replacing a stored value for the maximum value ("HWM") of Buffer Spaces Used with a new maximum number if the new Buffer Spaces Used value is more than the previously stored HWM; and Storing a metric proportional to HWM−LWM as a snapshot of the recent performance of the packet communication system.

10. The method of claim 9 wherein the step of storing the metric proportional to HWM−LWM comprises the sub-steps of:

recognizing the satisfaction of a trigger condition;

storing the metric proportional to HWM−LWM; and re-initializing HWM and LWM.

11. A method for use in calculating an estimate of a packet delay variation (PDV) metric for the recent operating characteristics of a packet communication system delivering packets to a Jitter Absorption Buffer (JAB), the method comprising:

Discarding incoming packets with sequence numbers that indicate that the incoming packet cannot be stored in the JAB and read out in sequence;

Storing the incoming packets remaining after the discard step, in a JAB memory slot that is appropriate for the packet to be read out in sequence;

Determining a Buffer Spaces Used value that is the number of addresses in a range of memory addresses starting with a next JAB memory address to be read and ending with a memory address containing the maximum sequence number (after adjusting for sequence number wrapping);

Replacing a stored value for the minimum value ("LWM") of Buffer Spaces Used with a new minimum number if the new Buffer Spaces Used value is less than the current LWM value;

Replacing a stored value for the maximum value ("HWM") of Buffer Spaces Used with a new maximum number if the new Buffer Spaces Used value is more than the current HWM value; and Storing a metric proportional to HWM−LWM as a snapshot of the recent performance of the packet communication system.

12. The method of claim 11 wherein the step of determining the Buffer Spaces Used value adjusts for the wrapping of memory addresses in a circular buffer.

13. The method of claim 11 wherein the step of storing the metric proportional to HWM−LWM comprises the sub-steps of:

recognizing the satisfaction of a trigger condition;

storing the metric proportional to HWM−LWM; and re-initializing HWM and LWM.

14. The method of claim 11 wherein the step of storing the metric proportional to HWM−LWM comprises the sub-steps of:

storing the metric proportional to HWM−LWM after an expiration of a timer running for period P, and re-initializing LWM and HWM.

15. The method of claim 11 wherein the step of storing a metric proportional to HWM−LWM stores a value proportional to (HWM−LWM)/R where R is the drain rate for the JAB.

16. The method of claim 11 further comprising a step of using the stored metric proportional to HWM−LWM in order to evaluate whether the operating characteristics of a packet communication system are in conformity with a service level agreement with the operators of the packet communication system.

17. The method of claim 11 further comprising modifying the operation the packet communication system in response to the recently obtained metric proportional to HWM−LWM.

18. The method of claim 11 further comprising the step of interfacing with a control system for the JAB to alter the number of address spaces available for use by the JAB based on the recently obtained metric proportional to HWM–LWM.

19. The method of claim 11 further comprising calculating a smoothed value of an average the of a most recent set of N metrics proportional to HWM–LWM.

20. The method of claim 13 wherein the satisfaction of the trigger condition is based on the receipt of a series of packets.

21. A method for use in calculating an estimate of a Packet Delay Variation (PDV) metric for the recent operating characteristics of a packet communication system delivering packets to a Jitter Absorption Buffer (JAB), the method comprising:

Storing the incoming packets in a JAB memory slot;

Determining a Buffer Spaces Used value that is the number of addresses in a range of memory addresses starting with a next JAB memory address to be read and ending with a memory address containing the most recently received incoming packet;

Replacing a stored value for the minimum value (LWM) of Buffer Spaces Used with a new minimum number when the new Buffer Spaces Used value is less than the stored LWM;

Replacing a stored value for the maximum value (HWM) of Buffer Spaces Used with a new maximum number when the new Buffer Spaces Used value is more than the stored HWM;

Storing a copy of the current value of LWM to a memory location and re-initializing LWM;

Storing a copy of the current value of HWM to a memory location and re-initializing HWM;

Setting LWMs to the minimum value of the last N stored values of LWM;

Setting HWMs to the maximum value of the last N stored values of HWM; and

Storing a metric proportional to HWMs–LWMs as an indication of the recent performance of the packet communication system.

22. A method for use in a packet communication system for calculating a real-time estimate of a quality of service metric for the packet communication system delivering packets to a Jitter Absorption Buffer (JAB), the JAB comprising: a set of storage slots corresponding to a set of memory addresses, a Current Read Pointer, and a Tail Pointer; the method comprising:

A) initializing:
  A LWM value;
  A HWM value;
  A first trigger counter set to count to Value A; and
  A second trigger counter set to count to Value B;

B) Placing an incoming packet into a storage slot in the JAB corresponding to a memory address;

C) If first trigger counter has reached Value A,
  THEN
  Calculating the number of Buffer Spaces Used;
  If Buffer Spaces Used<LWM then setting LWM= Buffer Spaces Used;
  If Buffer Spaces Used>HWM then setting HWM= Buffer Spaces Used; and
  Re-initializing first trigger counter;

D) If second trigger counter has reached Value B,
  THEN
  Store a current value proportional to (HWM–LWM); and
  GOTO Step A;
  ELSE
  GOTO Step B.

23. The method of claim 22 wherein Value A represents a number of packets received by the JAB.

24. The method of claim 22 wherein Value A represents a time interval.

25. A method for use in calculating an estimate of a Packet Delay Variation (PDV) metric for the recent operating characteristics of a packet communication system delivering packets to a Jitter Absorption Buffer (JAB), the method comprising:

Storing the incoming packets in a JAB memory slot;

Determining a Buffer Spaces Used value that is the number of addresses in a range of memory addresses starting with a next JAB memory address to be read and ending with a memory address containing a received incoming packet that will be read after all the other currently stored packets are read;

Storing a copy of the current value of Buffer Spaces Used value to a memory location; and Calculating a value for a first metric proportional to (max(set of I most recent Buffer Spaces Used values)– min(set of I most recent Buffer Spaces Used values)) as an indication of the recent performance of the packet communication system where I is greater than one.

* * * * *

UNITED STATES PATENT AND TRADEMARK OFFICE
CERTIFICATE OF CORRECTION

PATENT NO. : 6,728,209 B2
APPLICATION NO. : 10/200418
DATED : April 27, 2004
INVENTOR(S) : Pate et al.

It is certified that error appears in the above-identified patent and that said Letters Patent is hereby corrected as shown below:

Column 11, Line 13, "D) Please add text after Page 16 line 15 as follows" should be deleted.

Signed and Sealed this

Sixth Day of February, 2007

JON W. DUDAS
*Director of the United States Patent and Trademark Office*